United States Patent
Marsaly et al.

(10) Patent No.: US 9,616,717 B2
(45) Date of Patent: Apr. 11, 2017

(54) BEAD LOCK WITH WHEEL FLANGE PROTECTION

(71) Applicant: HUTCHINSON, S.A., Paris (FR)

(72) Inventors: Olivier Marsaly, Princeton, NJ (US); Lars Johan Resare, Ewing, NJ (US); Matthew Sherman, Elkins Park, PA (US); Anne-Audrey Tan, Franconville (FR); Olivier Noblanc, Levittown, PA (US)

(73) Assignee: HUTCHINSON, S.A., Paris (FR)

( * ) Notice: Subject to any disclaimer, the term of this patent is extended or adjusted under 35 U.S.C. 154(b) by 97 days.

(21) Appl. No.: 14/316,873

(22) Filed: Jun. 27, 2014

(65) Prior Publication Data

US 2015/0000810 A1  Jan. 1, 2015

Related U.S. Application Data

(60) Provisional application No. 61/840,427, filed on Jun. 27, 2013.

(51) Int. Cl.
  *B60C 5/16*  (2006.01)
  *B60C 15/02*  (2006.01)
  *B60C 15/028*  (2006.01)

(52) U.S. Cl.
  CPC ........ *B60C 15/0213* (2013.04); *B60C 15/028* (2013.01)

(58) Field of Classification Search
  CPC ... B60C 15/0213; B60C 15/028; B60C 15/00; B60C 15/02; B60C 15/0209; B60C 15/0223
  See application file for complete search history.

(56) References Cited

U.S. PATENT DOCUMENTS

| | | | | |
|---|---|---|---|---|
| 4,116,489 A | * | 9/1978 | Walther | ................ B60B 11/06 152/410 |
| 4,453,582 A | * | 6/1984 | Patecell | ............. B60C 15/0226 152/379.4 |
| 4,461,333 A | | 7/1984 | Filliol et al. | |
| 4,552,194 A | * | 11/1985 | Brown | .................. B60B 25/06 152/410 |

(Continued)

FOREIGN PATENT DOCUMENTS

EP  0297984  1/1989

OTHER PUBLICATIONS

International Preliminary Report on Patentability dated Jan. 7, 2016 for corresponding International Application PCT/US2014/044478.

(Continued)

*Primary Examiner* — James M Dolak
(74) *Attorney, Agent, or Firm* — K&L Gates LLP

(57) ABSTRACT

A system. The system includes a wheel, a tire and a bead lock assembly. The wheel defines an axis of rotation and includes an outboard wheel flange and an inboard wheel flange. The tire is mounted on the wheel, and the tire and the wheel cooperate to define a tire cavity. The bead lock assembly is within the tire cavity, and has a radially outermost surface which is a first distance from the axis of rotation. At least one of the outboard and inboard wheel flanges has a radially outermost surface which is a second distance from the axis of rotation. The first distance is greater than the second distance.

9 Claims, 15 Drawing Sheets

(56) References Cited

U.S. PATENT DOCUMENTS

| | | | | |
|---|---|---|---|---|
| 4,558,728 | A | * | 12/1985 | Forneris ............... B60C 15/028 152/400 |
| 4,768,573 | A | * | 9/1988 | Poque .................. B60C 15/024 152/378 R |
| 4,797,987 | A | * | 1/1989 | Bush ................... B60C 15/028 29/433 |
| 5,000,240 | A | * | 3/1991 | Jones, Jr. ............. B60C 15/028 152/379.5 |
| 5,000,241 | A | * | 3/1991 | Patecell ................ B60B 21/12 152/381.5 |
| 5,271,443 | A | * | 12/1993 | Boni ..................... B60B 21/12 152/381.4 |
| 5,343,920 | A | * | 9/1994 | Cady .................... B60B 25/22 152/396 |
| 5,355,923 | A | * | 10/1994 | Boni ..................... B60C 15/028 152/381.6 |
| 5,450,887 | A | * | 9/1995 | Habay ................... B60C 17/06 152/520 |
| 5,495,881 | A | * | 3/1996 | Girard .................. B60C 15/028 152/400 |
| 5,836,366 | A | * | 11/1998 | Muhlhoff ............... B60C 25/00 152/379.3 |
| 5,975,171 | A | * | 11/1999 | Rivaton ................. B60C 17/06 152/158 |
| 5,984,421 | A | * | 11/1999 | Proctor ................. B60B 25/14 152/401 |
| 7,131,477 | B2 | * | 11/2006 | Smith .................... B60C 5/22 152/340.1 |
| 7,575,030 | B2 | * | 8/2009 | Resare ................. B60C 15/028 152/152 |
| 7,918,255 | B2 | * | 4/2011 | Heuze .................. B60C 15/028 152/152 |
| 8,151,846 | B2 | * | 4/2012 | Lipper .................. B60B 3/08 152/379.5 |
| 8,196,625 | B1 | | 6/2012 | Chenoweth |
| 8,196,629 | B2 | * | 6/2012 | Gardetto .............. B60C 15/028 152/401 |
| 8,397,778 | B2 | * | 3/2013 | Marsaly ............... B60C 15/028 152/158 |
| 9,096,101 | B2 | * | 8/2015 | Khatib ................. B60C 15/028 |
| 9,283,815 | B2 | * | 3/2016 | Watarai ............... B60B 21/125 |
| 2005/0056355 | A1 | | 3/2005 | Tavin et al. |
| 2006/0005906 | A1 | | 1/2006 | Resare et al. |
| 2010/0066155 | A1 | * | 3/2010 | Seradarian ............ B60B 7/01 301/37.22 |
| 2010/0170607 | A1 | | 7/2010 | Marsaly et al. |

OTHER PUBLICATIONS

International Search Report and Written Opinion for corresponding International Application No. PCT/US2014/44478, dated Oct. 27, 2014.

* cited by examiner

BEAD LOCK WITH WHEEL FLANGE PROTECTION

CROSS-REFERENCE TO RELATED APPLICATION

This application claims the benefit under 35 U.S.C. §119(e) of the earlier filing date of U.S. Provisional Patent Application No. 61/840,427 filed on Jun. 27, 2013.

BACKGROUND

This application discloses an invention which is related, generally and in various embodiments, to a bead lock which is configured to provide protection to the wheel flanges when a tire mounted on the wheel is operated at a low tire pressure.

In applications where a tire of a vehicle is intentionally operated at a lower than normal tire pressure, the tire beads may become separated from one or both wheel flanges. If a tire bead becomes separated from a wheel flange, the air pressure in the tire can quickly escape to the atmosphere, leading to substantial and/or total deflation of the tire. With a tire substantially and/or totally deflated, the wheel flanges are basically forced to carry the portion of the vehicle's weight normally carried by the inflated tire, which in turn is supported by the wheel through the standardized tire-wheel interface geometry. When this condition arises, significant damage to one or both wheel flanges is typically incurred. In some situations, the vehicle can even be rendered immobile. In any event, the damaged wheels often need to be replaced in order for the vehicle to maintain its expected performance. The cost and the downtime associated with replacing the wheels can be significant.

For many off-road and military applications, where the tires can experience high lateral forces, be sliced or punctured by sharp or jagged objects, be subjected to a ballistic event, etc., it is far too common for the tires to become substantially and/or totally deflated, leading to the tire beads separating from the wheel flanges and subsequent damage to the wheel flanges.

It is a known and established method to utilize bead locks installed inside the cavity of a tire mounted on a wheel in order to keep the beads of a tire secured against the flanges of the wheel. Such an internal bead lock is used to apply lateral pressure on the tire beads to secure and in a sense "lock" them to the bead-seat and flange areas of the wheel flange. By locking the tire beads to the wheel flanges, a tire can be operated at lower than normal tire pressures in order to increase the tire ground contact patch and thus increase tire traction and flotation, with less risk of the tire beads separating from the wheel flanges (de-seating) and the tire rapidly deflating. Additionally, having a tire locked to the wheel flanges allows the vehicle to operate at lower than normal tire pressures in extreme torque transfer situations (e.g., situations involving an incline, a decline, rapid acceleration and deceleration, etc.) without the tire slipping or spinning on the wheel.

FIG. 1 illustrates a known bead lock. This bead lock, commonly known as an internal metal bead lock, includes an annular shaped metal piece and two rubber or elastomer pieces. The annular shaped metal piece is configured to have its two "ends" connected together to form a ring. The two rubber or elastomer pieces are positioned over the respective "edges" of the metal pieces. FIG. 2 illustrates a cross section of the bead lock of FIG. 1 installed in a cavity of a tire mounted on a wheel. As shown in FIG. 2, the rubber or elastomer pieces are the components of the bead lock which are in contact with the "interior" surface of the tire, and the "exterior" surface of the tire is in contact with the wheel flanges.

FIG. 3 illustrates another known bead lock. This bead lock, known as an internal rubber bead lock, is an annularly shaped "band" of rubber. FIG. 4 illustrates a cross-section of the bead lock of FIG. 3 installed in a cavity of a tire mounted on a wheel. As shown in FIG. 4, the respective "edges" of the bead lock are in contact with the "interior" surface of the tire, and the "exterior" surface of the tire is in contact with the wheel flanges.

Current bead locks do not adequately prevent damage inflicted on the wheel flanges, can result in the vehicle being rendered immobile due to the damaged wheels, and do not adequately contribute to the avoidance of the cost and downtime associated with having to replace the damaged wheels.

BRIEF DESCRIPTION OF THE DRAWINGS

Various embodiments of the invention are described herein in by way of example in conjunction with the following figures, wherein like reference characters designate the same or similar elements.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 3:
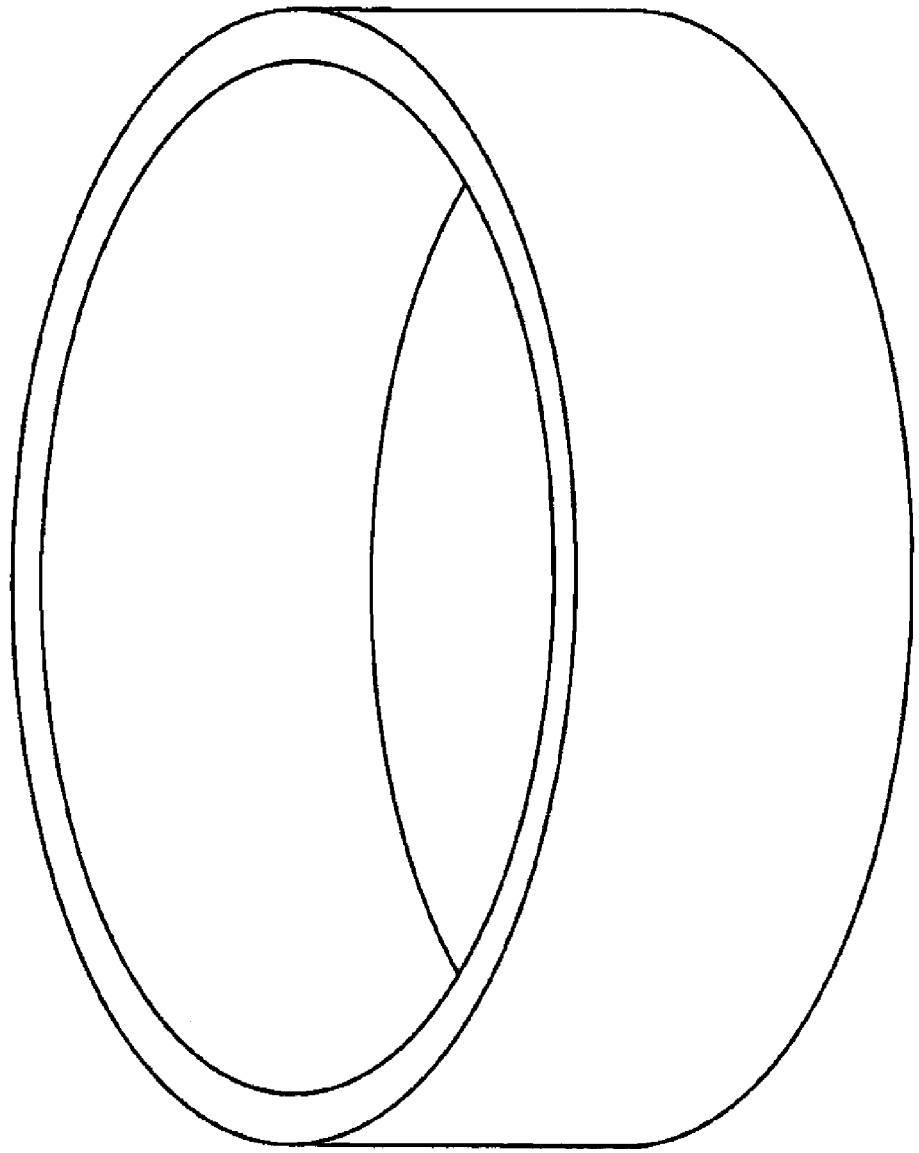
FIG. 3 illustrates another known bead lock.
Figure 5:
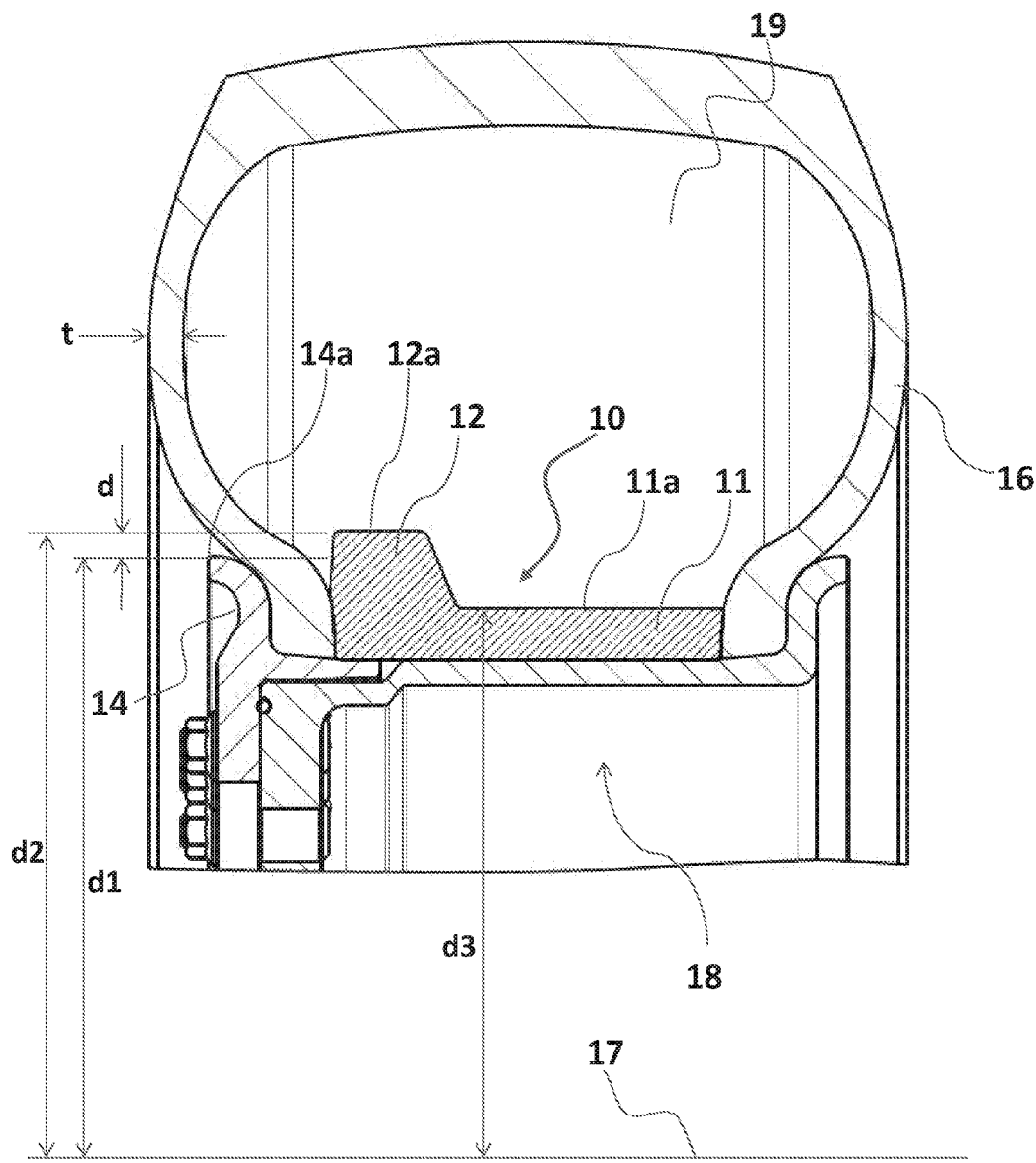
FIG. 5 illustrates a cross-section of a bead lock according to various embodiments.

FIG. 5 illustrates a cross-section of a bead lock 10 according to various embodiments. The bead lock 10 includes an "outboard" end and an "inboard" end, and may be fabricated from any suitable material. For example, according to various embodiments, the bead lock 10 is fabricated from a "soft" material such as, for example, a rubber or an elastomer. According to other embodiments, the bead lock 10 is fabricated from a hard, non-compliant material such as, for example, a metal, a plastic or a composite material. As shown in FIG. 5, the bead lock 10 is different from the "uniform" bead lock of FIG. 3 in that a raised portion 12 of bead lock 10 is "taller" than the rest of the bead lock 10 and extends above the outboard wheel flange 14 a distance "d" when the bead lock 10 is installed. According to various embodiments, the raised portion 12 extends at least a pre-determined distance above the outboard wheel flange 14 when the bead lock 10 is installed. For example, the pre-determined distance above the wheel flange 14 may be substantially equal to or greater than the thickness "t" of the sidewall of a tire 16 mounted on the wheel 18.

Although the raised portion 12 of the bead lock 10 is shown in FIG. 5 as being the outboard side (curb-side) of the bead lock 10, it will be appreciated that according to other embodiments, the raised portion 12 may be at a different part of the bead lock 10 (e.g., at the inboard side of the bead lock 10, in the "middle" of the bead lock 10, etc.). Also, although only one raised portion 12 is shown in FIG. 5, it will be appreciated that according to other embodiments, the bead lock 10 may include more than one raised portion 12 (e.g., one raised portion 12 on the outboard side and one raised portion 12 on the inboard side). Additionally, it will be appreciated that according to various embodiments the bead lock 10 may be a single bead lock 10 which extends around the circumference of the wheel 18, or according to other embodiments, may include a plurality of bead locks 10 connected together around the circumference of the wheel 18 to form a single bead lock assembly 10.

Figure 4:
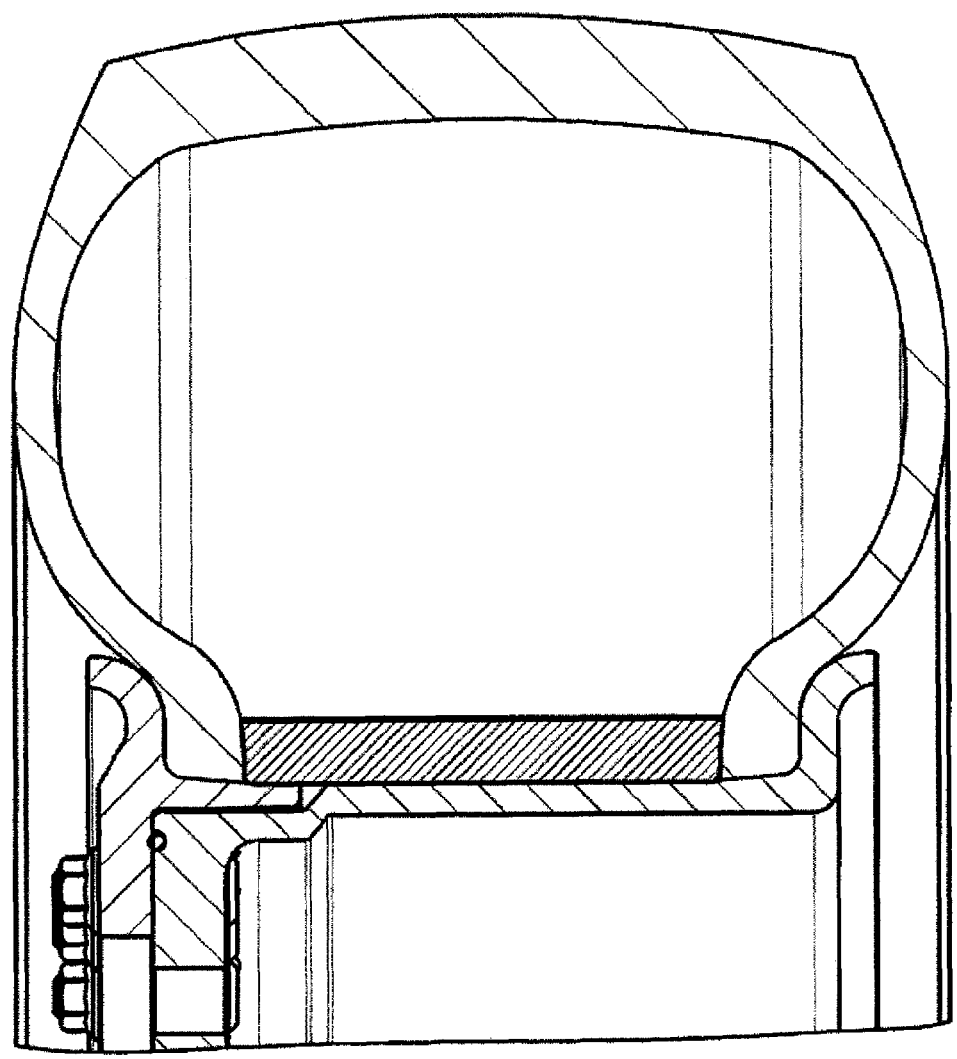
FIG. 4 illustrates a cross-section of the bead lock of FIG. 3 installed within a cavity of a tire mounted on a wheel.

Collectively, the bead lock 10, the tire 16 and the wheel 18 form a system. The tire 16 is mounted on the wheel 18, and the tire 16 and the wheel 18 cooperate to define a tire cavity 19. The wheel 18 includes outboard and inboard wheel flanges 14, and defines an axis of rotation 17. At least one of the outboard and inboard flanges 14 has a radially outermost surface 14a which is a first distance "d1" from the axis of rotation 17. The bead lock 10 is positioned within the tire cavity 19, and includes a first portion 12 (the raised portion) which has a radially outermost surface 12a which is a second distance "d2" from the axis of rotation 17, wherein the second distance d2 is greater than the first distance d1 (the bead lock 10 extends above the wheel flange 14). As shown in FIG. 5, the bead lock 10 also includes a second portion 11 (the rest of the bead lock 10) which has a radially outermost surface 11a which is a third distance "d3" from the axis of rotation 17. The cross-section of the second portion 11 is similar to the cross-section of the "uniform" bead lock of FIG. 3 which is shown in FIG. 4. According to various embodiments the radially outermost surface 12a of the bead lock 10 is at the outboard end of the bead lock 10. According to other embodiments, the radially outermost surface 12a of the bead lock 10 is at the inboard end of the bead lock 10. According to yet other embodiments, the radially outermost surface 12a of the bead lock 10 is at both the outboard and inboard ends of the bead lock 10. According to yet even other embodiments, the radially outermost surface 12a of the bead lock 10 is between the outboard and inboard ends of the bead lock 10.

Figure 6A:
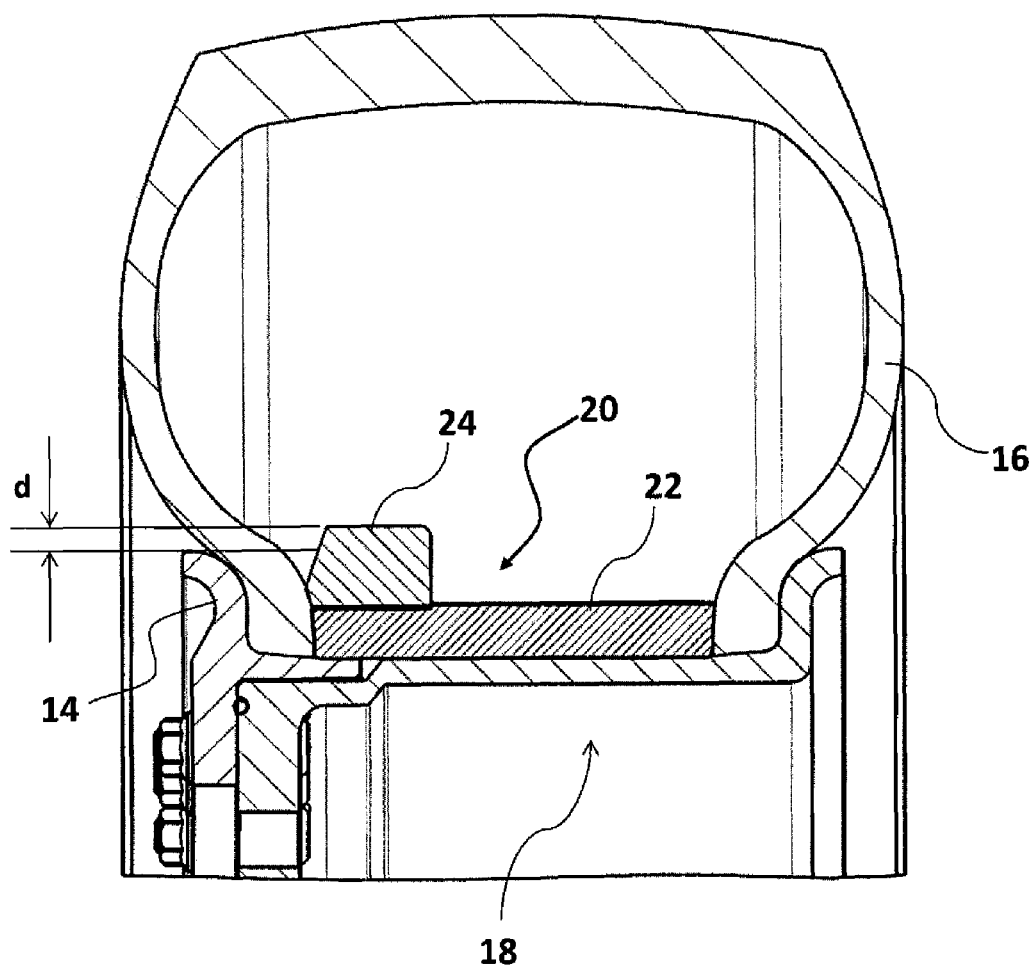
FIGS. 6A and 6B illustrate cross-sections of various embodiments of bead lock assemblies.

FIG. 6A illustrates a cross-section of various embodiments of a bead lock assembly 20. As shown in FIG. 6A, the bead lock assembly 20 has an outboard end and an inboard end, and is similar to the bead lock 10, but is different in that the bead lock assembly 20 includes at least two components, a first member 22 and a second member 24. The first and second members 22, 24 may be fabricated from soft materials, hard materials, combinations thereof, etc. The second member 24 is positioned "above" (radially outward from) the first member 22 and extends above the outboard wheel flange 14 a distance "d" when the bead lock assembly 20 is installed. According to various embodiments, the second member 24 is clamped and positioned against the first member 22 and the interior surface of the tire 16. According to other embodiments, the second member 24 may be adhered to the first member 22. Similar to the bead lock 10, according to various embodiments, the second member 24 extends at least a pre-determined height above the outboard wheel flange 14 when the bead lock assembly 20 is installed. For example, the pre-determined height above the wheel flange 14 may be substantially equal to or greater than the thickness of the sidewall of the tire 16.

Although the second member 24 of the bead lock assembly 20 is shown in FIG. 6A as being at the outboard end (curb-side) of the bead lock assembly 20, it will be appreciated that according to other embodiments, the second member 24 may be at a different part of the bead lock assembly 20 (e.g., at the inboard end of the bead lock assembly 20, in the "middle" of the bead lock assembly 20, etc.). Also, although only one second member 24 is shown in FIG. 6A, it will be appreciated that according to other embodiments, the bead lock assembly 20 may include more than one second member 24 (e.g., one second member 24 at the outboard end and one second member 24 at the inboard end). Additionally, it will be appreciated that according to various embodiments the first member 22 may be a single first member 22 which extends around the circumference of the wheel 18, or according to other embodiments, may include a plurality of first members 22 connected together around the circumference of the wheel 18 to form a first member 22 subassembly. Similarly, it will be appreciated that the second member 24 may be a single second member 24 which extends around the circumference of the wheel 18, or may include a plurality of second members 24 connected together around the circumference of the wheel 18 to form a second member 24 subassembly. Collectively, the tire 16, the wheel 18 and the bead lock assembly 20 form a system.

Figure 6B:
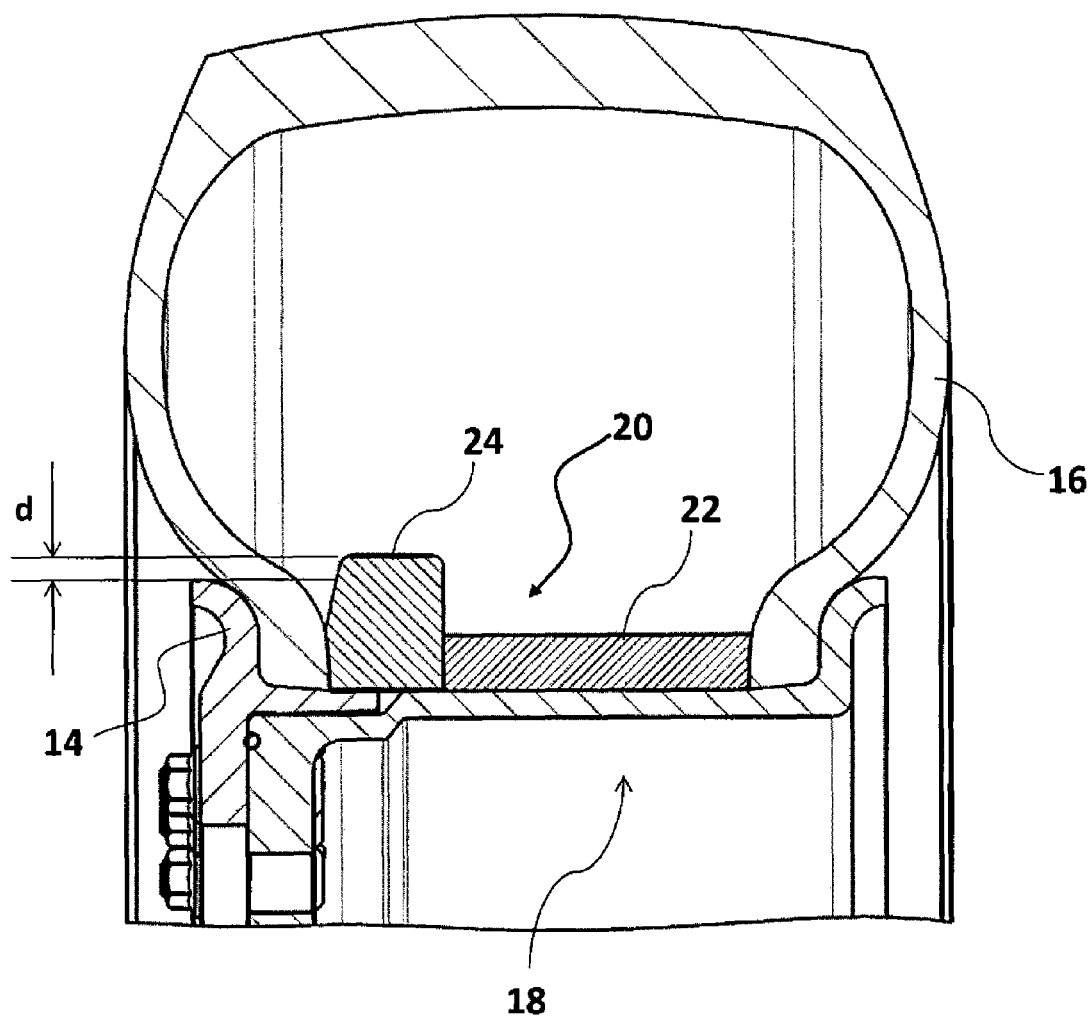

FIG. 6B illustrates a cross-section of other embodiments of the bead lock assembly 20. Except for the different positioning of the second member 24, the embodiments of the bead lock assembly 20 shown in FIG. 6B may be otherwise identical to the above-described embodiments of the bead lock assembly 20 shown in FIG. 6A. Whereas the second member 24 of the embodiments of the bead lock assembly 20 shown in FIG. 6A is positioned "above" the first member 22, the second member 24 of the embodiments of the bead lock assembly 20 shown in FIG. 6B is adjacent the first member 22 and extends above the outboard wheel flange 14 a distance "d" when the bead lock assembly 20 is installed.

Figure 7:
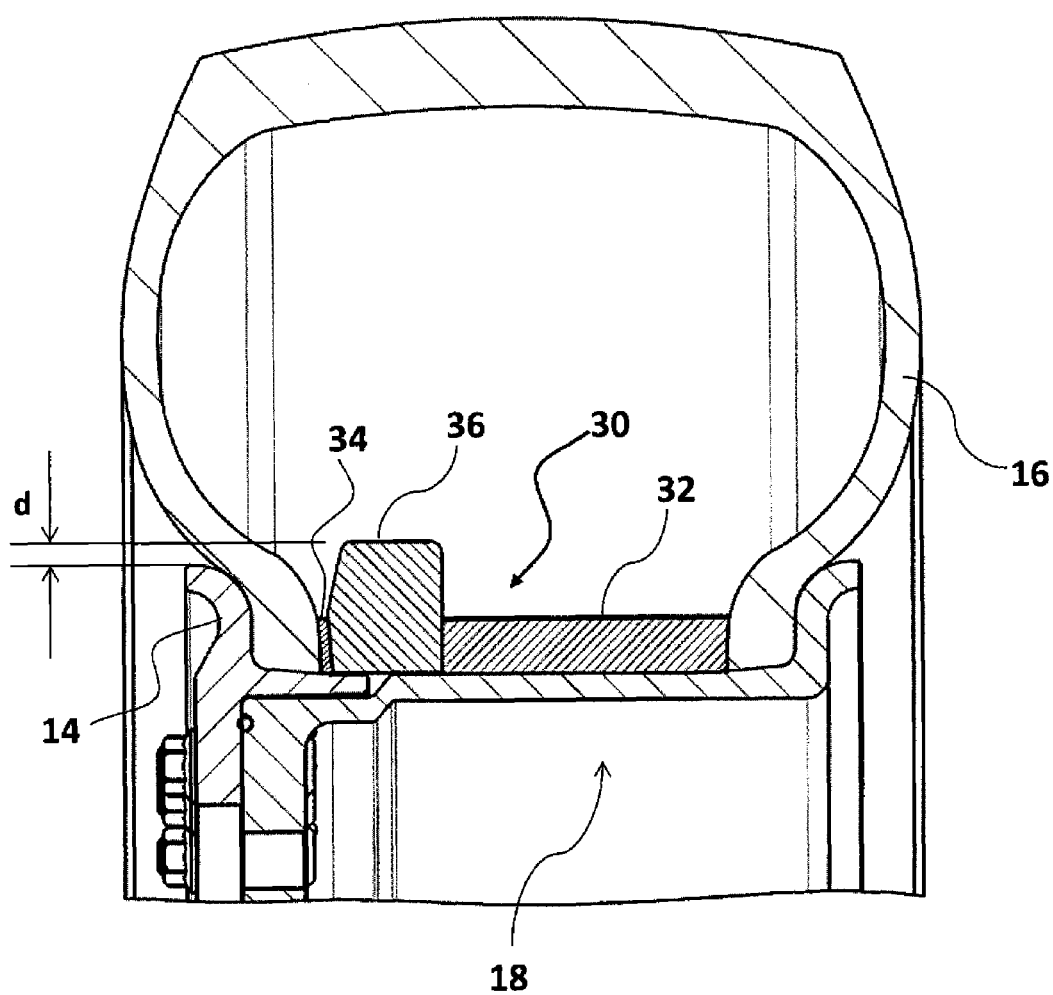
FIG. 7 illustrates a cross-section of another bead lock assembly according to various embodiments.

FIG. 7 illustrates various embodiments of a bead lock assembly 30. The bead lock assembly 30 has an outboard end and an inboard end, and is similar to the bead lock assembly 20 shown in FIG. 6B, but is different in that the bead lock assembly 30 includes at least three components, a first member 32, a second member 34 and a third member 36. The first and second members 32, 34 may be fabricated from soft materials, hard materials, combinations thereof, etc. For example, the first and second members 32, 34 may be fabricated from a "soft" material and the third member 36 may be fabricated from a "hard" material. The third member 36 is positioned between the first and second members 32, 34 and extends above the outboard wheel flange 14 a distance "d" when the bead lock assembly 30 is installed. According to various embodiments, the first member 32 is clamped and positioned against the inboard side of the interior surface of the tire 16 and the third member 36, the second member 34 is clamped and positioned against the inboard side of the interior surface of the tire 16 and the third member 36, and the third member 36 is clamped and positioned against the first and second members 32, 34. According to other embodiments, the third member 36 may be adhered to the first member 32 and/or the second member 34. According to various embodiments, the third member 36 extends at least a pre-determined height above the outboard wheel flange 14 when the bead lock assembly 30 is installed. For example, the pre-determined height above the wheel flange 14 may be substantially equal to or greater than the thickness of the sidewall of the tire 16.

Although the third member 36 of the bead lock assembly 30 is shown in FIG. 7 as being closer to the outboard end (curb-side) of the bead lock assembly 30, it will be appreciated that according to other embodiments, the third member 36 may be at a different part of the bead lock assembly 30 (e.g., closer to the inboard end of the bead lock assembly 30, near the "middle" of the bead lock assembly 30, etc.). For embodiments where the third member 36 is closer to the inboard end of the bead lock assembly 30, the second member 34 is positioned between the inboard end of the third member 36 and the interior surface of the tire 16, and the first member 32 is positioned between the outboard end of the third member 34 and the interior surface of the tire 16. Also, although only one second member 34 and one third member 36 are shown in FIG. 7, it will be appreciated that according to other embodiments, the bead lock assembly 30 may include more than one second member 34 (e.g., one second member 34 on the outboard side and one second member 34 on the inboard side) and more than one third member 36 (one against the inboard second member 34 and one against the outboard second member 34).

Additionally, it will be appreciated that according to various embodiments the first member 32 may be a single first member 32 which extends around the circumference of the wheel 18, or according to other embodiments, may include a plurality of first members 32 connected together around the circumference of the wheel 18 to form a fust member 32 subassembly. Similarly, it will be appreciated that the second member 34 may be a single second member 34 which extends around the circumference of the wheel 18, or may include a plurality of second members 34 connected together around the circumference of the wheel 18 to form a second member 34 subassembly. Similarly, it will be appreciated that the third member 36 may be a single third member 36 which extends around the circumference of the wheel 18, or may include a plurality of third members 36 connected together around the circumference of the wheel 18 to form a third member 36 subassembly. Collectively, the tire 16, the wheel 18 and the bead lock assembly 30 form a system.

Figure 8:
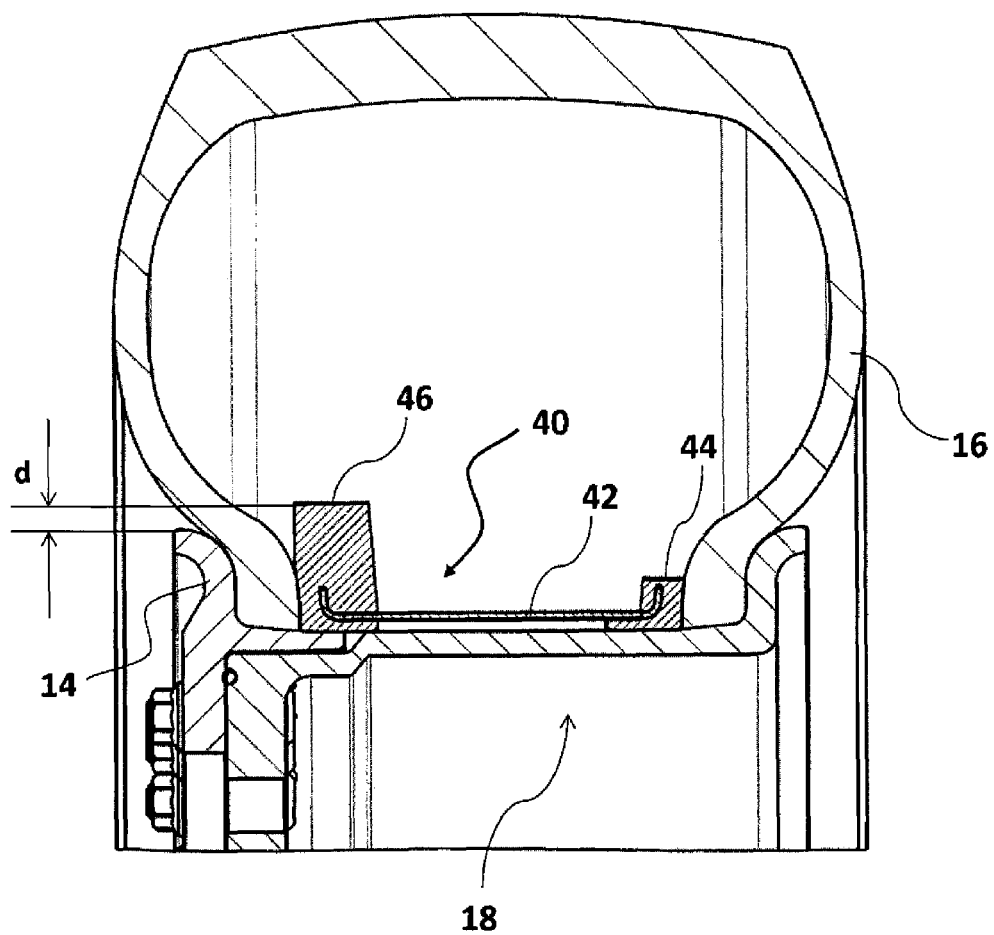
FIG. 8 illustrates a cross-section of yet another bead lock assembly according to various embodiments.

FIG. 8 illustrates a cross-section of a bead lock assembly 40 according to various embodiments. The bead lock assembly 40 includes an outboard end and an inboard end, is similar to the bead lock assembly 30 of FIG. 7 in that it includes at least three components (a first member 42, a second member 44 and a third member 46), but is different in that the outboard and inboard ends of the first member 42 are surrounded by the second and third members 44, 46. The third member 46 extends above the outboard wheel flange 14 a distance "d" when the bead lock assembly 40 is installed. According to various embodiments, the third member 46 extends at least a pre-determined distance above the outboard wheel flange 14 when the bead lock assembly 40 is installed. For example, the pre-determined distance above the wheel flange 14 may be substantially equal to or greater than the thickness of the sidewall of the tire 16.

The first, second and third members 42, 44, 46 may be fabricated from any suitable material. For example, according to various embodiments, the second and third members 44, 46 are fabricated from a "soft" material (e.g., a rubber, an elastomer, etc.) whereas the first member 42 is fabricated from a "hard" material (e.g., a metal, a plastic, a composite material, etc.). The second member 44 is positioned around an inboard "end" of the first member 42 and against an interior surface of the tire 16. The third member 46 is positioned around an outboard "end" of the first member 42 and against an interior surface of the tire 16. According to various embodiments, the second member 44 is clamped and positioned against the inboard side of the interior surface of the tire 16 and the first member 42, and the third member 46 is clamped and positioned against the outboard side of the interior surface of the tire 16 and the first member 42. According to other embodiments, the second member 44 and/or the third member 46 may be adhered to the first member 42.

Although the third member 46 of the bead lock assembly 40 is shown in FIG. 8 as being at the outboard end (curb-side) of the bead lock assembly 40, it will be appreciated that according to other embodiments, the third member 46 may be at a different part of the bead lock assembly 40 (e.g., at the inboard end of the bead lock assembly 40, in the "middle" of the bead lock assembly 40, etc.). For embodiments where the third member 46 is at the inboard end of the bead lock assembly 40, the second member 44 may be positioned at the outboard end of the bead lock assembly 40. Also, although only one third member 46 is shown in FIG. 8, it will be appreciated that according to other embodiments, the bead lock assembly 40 may include more than one third member 46 (e.g., one at the inboard end and one at the outboard end) or that the second member 44 may also extend a distance (e.g., distance "d") above the inboard wheel flange 14 when the bead lock assembly 40 is installed.

Additionally, it will be appreciated that according to various embodiments the first member 42 may be a single first member 42 which extends around the circumference of the wheel 18, or according to other embodiments, may include a plurality of first members 42 connected together around the circumference of the wheel 18 to form a first member 42 subassembly. Similarly, it will be appreciated that the second member 44 may be a single second member 44 which extends around the circumference of the wheel 18, or may include a plurality of second members 44 connected together around the circumference of the wheel 18 to form a second member 44 subassembly. Similarly, it will be appreciated that the third member 46 may be a single third member 46 which extends around the circumference of the wheel 18, or may include a plurality of third members 46 connected together around the circumference of the wheel 18 to form a third member 46 subassembly. Collectively, the tire 16, the wheel 18 and the bead lock assembly 40 form a system.

Figure 9:
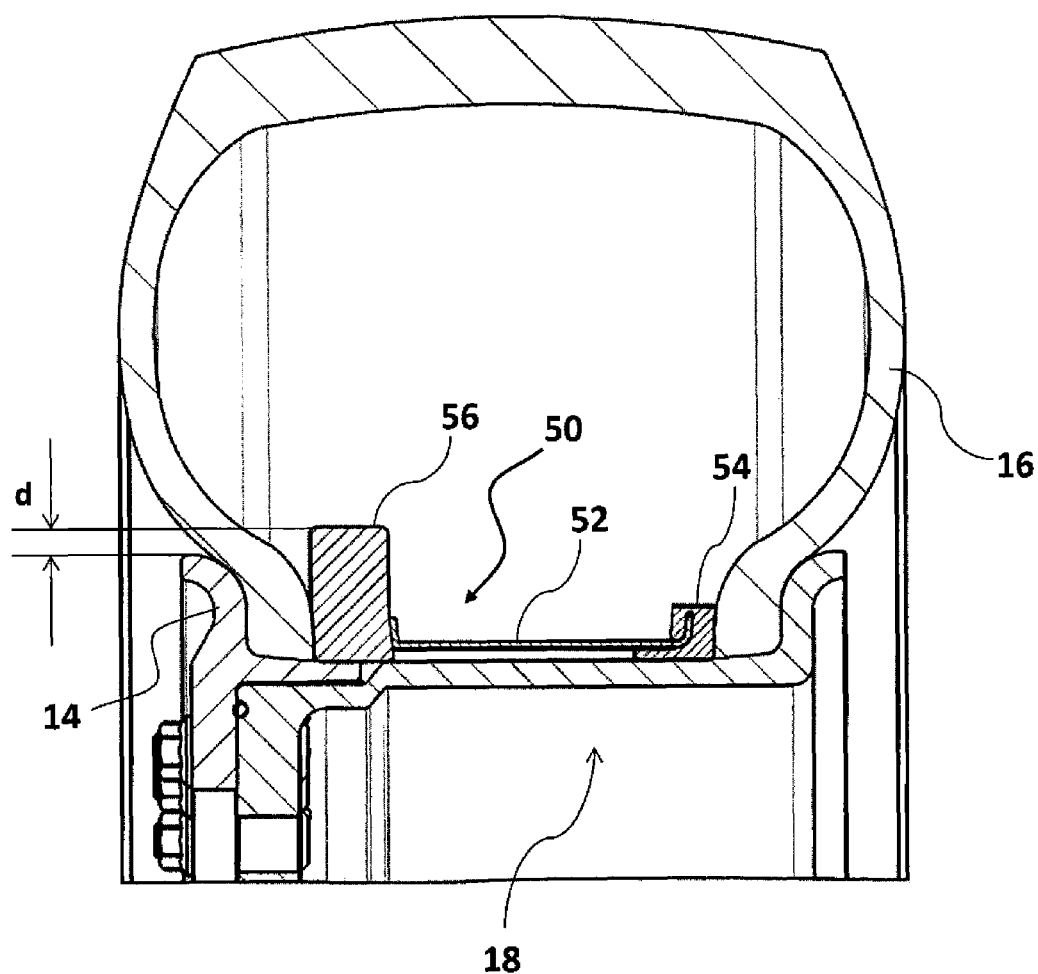
FIG. 9 illustrates a cross-section of yet another bead lock assembly according to various embodiments.

FIG. 9 illustrates a cross-section of a bead lock assembly 50 according to various embodiments. The bead lock assembly 50 includes an outboard end and an inboard end, is similar to the bead lock assembly 40 of FIG. 8, but is different in that the third member 56 is not positioned around an outboard "end" of the first member 52. Rather, the third member 56 is merely positioned against an outboard "end" of the first member 52 and an interior surface of the tire 16. The third member 56 extends above the outboard wheel flange 14 a distance "d" when the bead lock assembly 50 is installed. According to various embodiments, the third member 56 extends at least a pre-determined distance above the outboard wheel flange 14 when the bead lock assembly 50 is installed. For example, the pre-determined distance above the wheel flange 14 may be substantially equal to or greater than the thickness of the sidewall of the tire 16.

The first, second and third members 52, 54, 56 may be fabricated from any suitable material. For example, according to various embodiments, the second and third members 54, 56 are fabricated from a "soft" material (e.g., a rubber, an elastomer, etc.) whereas the first member 52 is fabricated from a "hard" material (e.g., a metal, a plastic, a composite material, etc.). The second member 54 is positioned around an inboard "end" of the first member 52 and against an interior surface of the tire 16. The third member 56 is positioned against an outboard "end" of the first member 52 and an interior surface of the tire 16. According to various embodiments, the second member 54 is clamped and positioned against the inboard side of the interior surface of the tire 16 and the first member 52, and the third member 56 is clamped and positioned against the outboard side of the interior surface of the tire 16 and the first member 52. According to other embodiments, the second member 54 and/or the third member 56 may be adhered to the first member 52.

Although the third member 56 of the bead lock assembly 50 is shown in FIG. 9 as being at the outboard end (curbside) of the bead lock assembly 50, it will be appreciated that according to other embodiments, the third member 56 may be at a different part of the bead lock assembly 50 (e.g., at the inboard end of the bead lock assembly 50, in the "middle" of the bead lock assembly 50, etc.). For embodiments where the third member 56 is at the inboard end of the bead lock assembly 50, the second member 54 may be positioned at the outboard end of the bead lock assembly 50. Also, although only one third member 56 is shown in FIG. 9, it will be appreciated that according to other embodiments, the bead lock assembly 50 may include more than one third member 56 (e.g., one at the inboard end and one at the outboard end) or that the second member 54 may also extend a distance (e.g., distance "d") above the inboard wheel flange 14 when the bead lock assembly 50 is installed.

Additionally, it will be appreciated that according to various embodiments the first member 52 may be a single first member 52 which extends around the circumference of the wheel 18, or according to other embodiments, may include a plurality of first members 52 connected together around the circumference of the wheel 18 to form a first member 52 subassembly. Similarly, it will be appreciated that the second member 54 may be a single second member 54 which extends around the circumference of the wheel 18, or may include a plurality of second members 54 connected together around the circumference of the wheel 18 to form a second member 54 subassembly. Similarly, it will be appreciated that the third member 56 may be a single third member 56 which extends around the circumference of the wheel 18, or may include a plurality of third members 56 connected together around the circumference of the wheel 18 to form a third member 56 subassembly. Collectively, the tire 16, the wheel 18 and the bead lock assembly 50 form a system.

Figure 1:
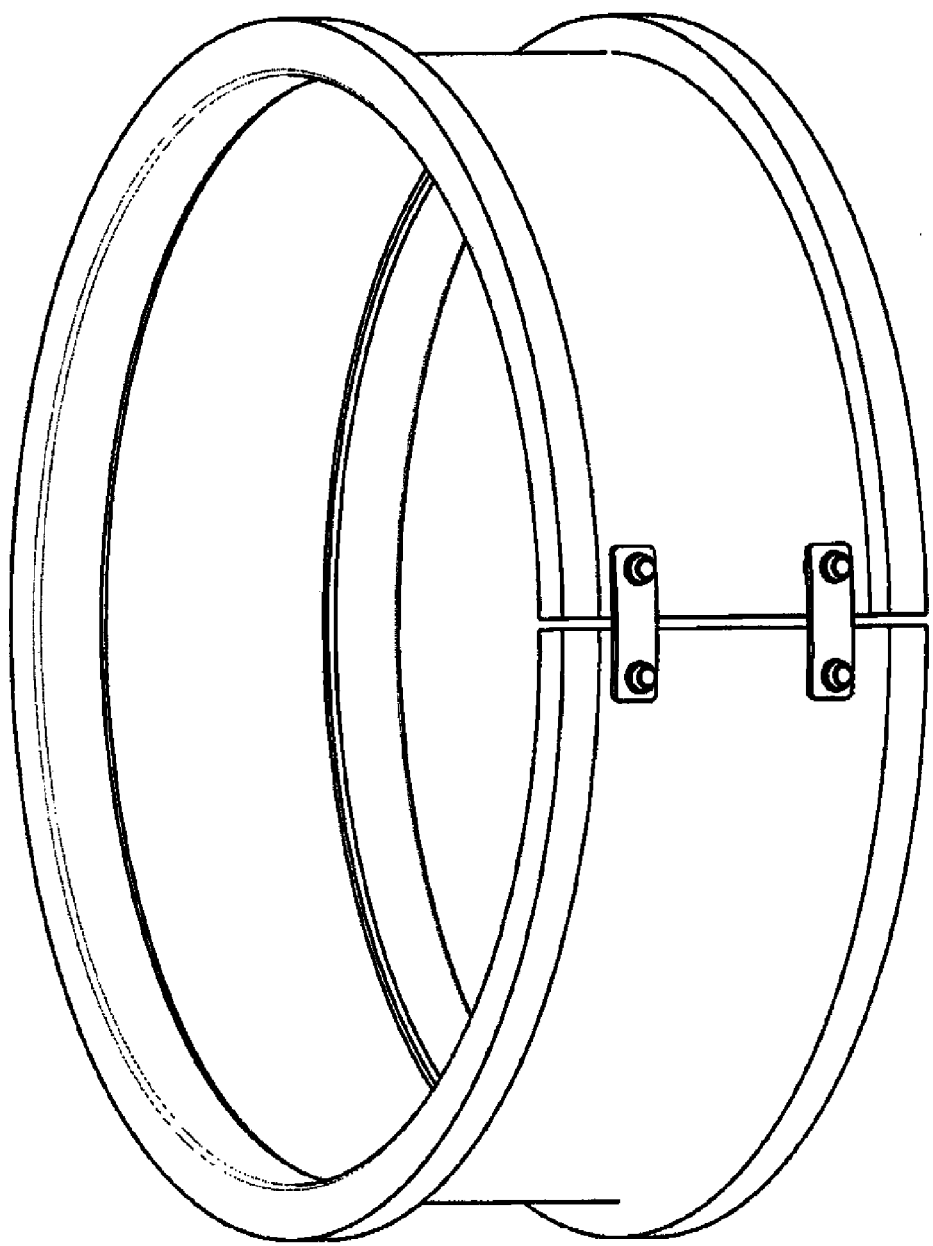
FIG. 1 illustrates a known bead lock.
Figure 2:
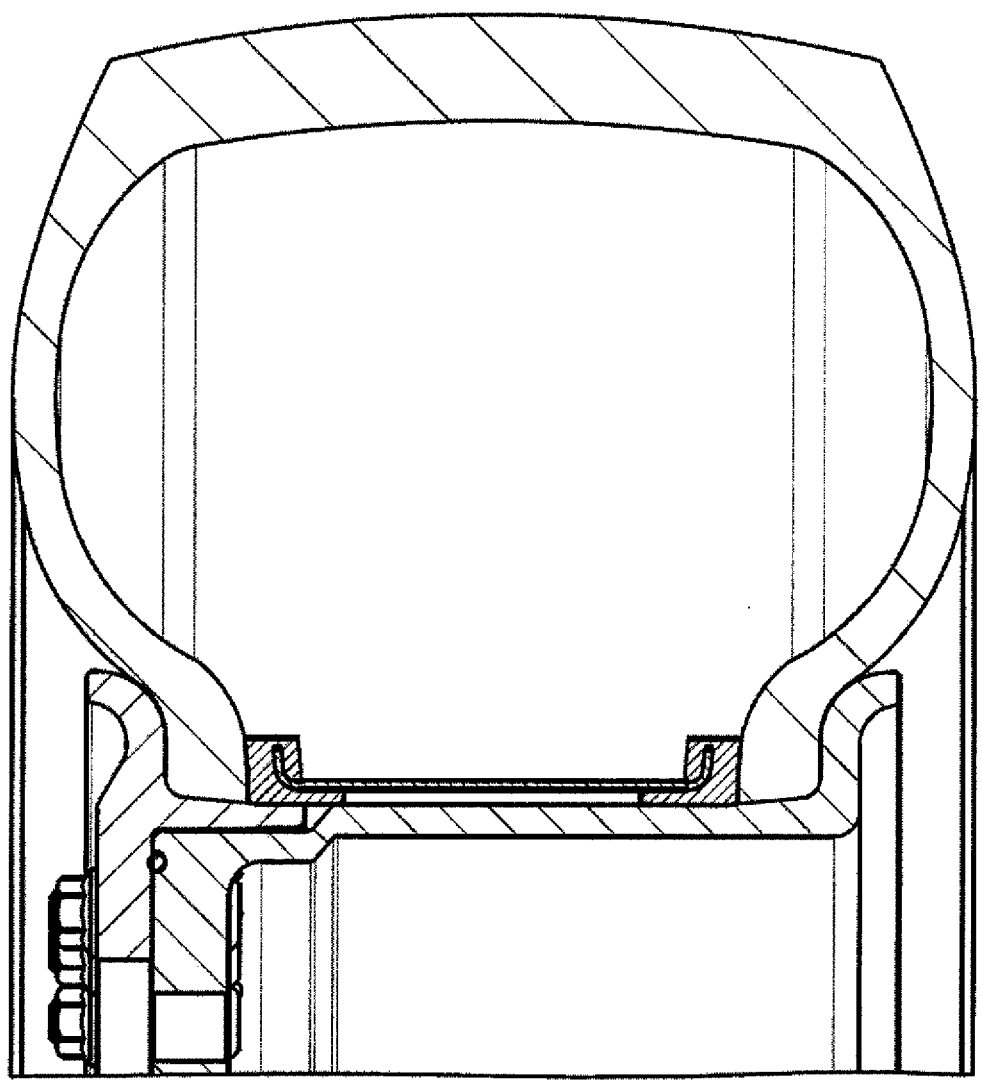
FIG. 2 illustrates a cross-section of the bead lock of FIG. 1 installed within a cavity of a tire mounted on a wheel.
Figure 10:
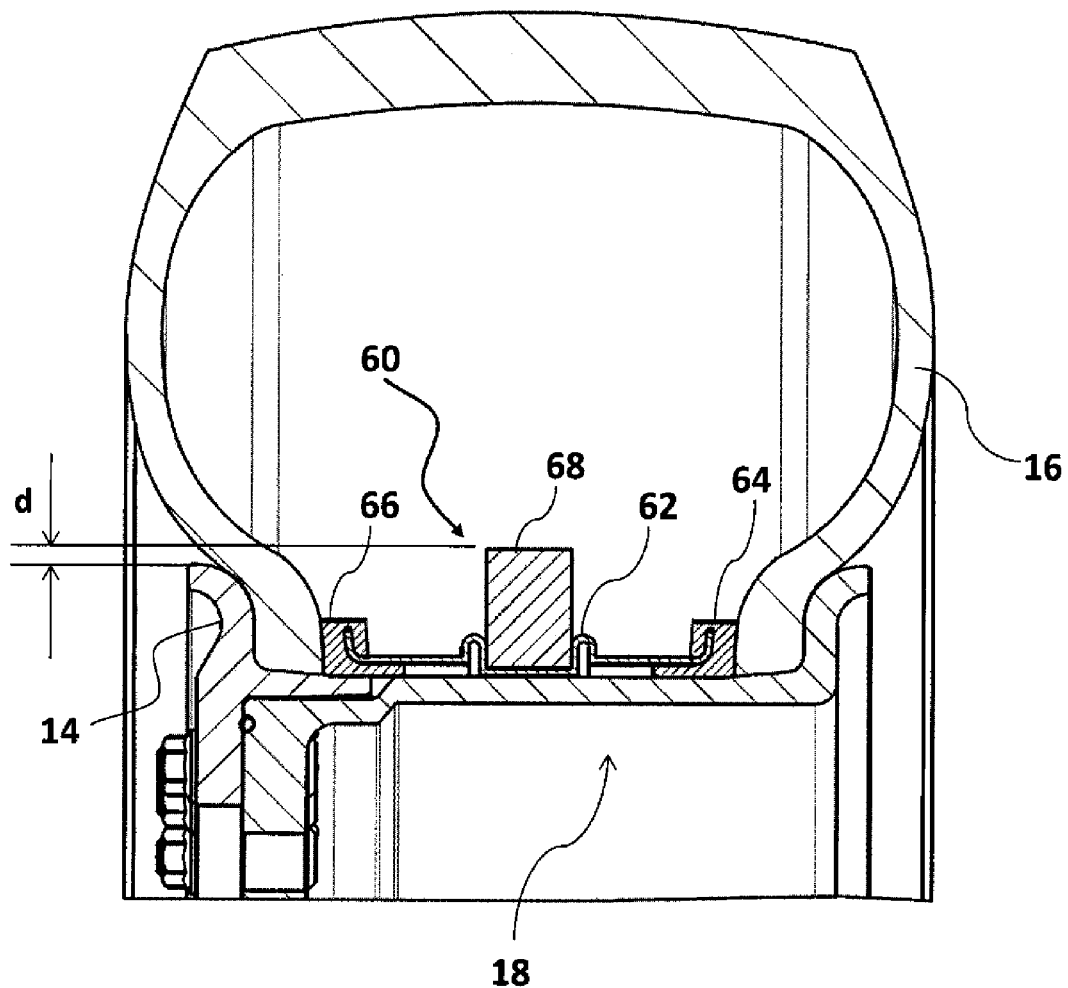
FIG. 10 illustrates a cross-section of yet another bead lock assembly according to various embodiments.

FIG. 10 illustrates a cross-section of a bead lock assembly 60 according to various embodiments. The bead lock assembly 60 is similar to the bead lock of FIG. 1, but is different in that the bead lock assembly 60 includes at least four components: a first member 62; a second member 64; a third member 66 and a fourth member 68. The bead lock assembly 60 is also different in that the fourth member 68 extends above the outboard wheel flange 14 a distance "d" when the bead lock assembly 60 is installed. According to various embodiments, the fourth member 68 extends at least a pre-determined distance above the outboard wheel flange 14 when the bead lock assembly 60 is installed. For example, the pre-determined distance above the wheel flange 14 may be substantially equal to or greater than the thickness of the sidewall of the tire 16. The bead lock assembly 60 is also different in that a "middle" portion of the first member 62 is formed with a groove or channel 69 to accommodate the secure positioning of the fourth member 68 above (radially outward from) the "middle" portion of the first member 62.

The first, second, third and fourth members 62, 64, 66, 68 may be fabricated from any suitable material. For example, according to various embodiments, the second, third and fourth members 64, 66, 68 are fabricated from a "soft" material (e.g., a rubber, an elastomer, etc.) whereas the first member 62 is fabricated from a "hard" material (e.g., a metal, a plastic, a composite material, etc.). The second member 64 is positioned around an inboard "end" of the first member 62 and against an interior surface of the tire 16. The third member 66 is positioned around an outboard "end" of the first member 62 and against an interior surface of the tire 16. The fourth member 68 is positioned "over" the middle of the first member 62. According to various embodiments, the second member 64 is clamped and positioned against the inboard side of the interior surface of the tire 16 and the first member 62, the third member 66 is clamped and positioned against the outboard side of the interior surface of the tire 16 and the first member 62, and the fourth member 68 is clamped and positioned above the "middle" of the first member 62. According to other embodiments, the second member 64, the third member 66 and/or the fourth member 68 may be adhered to the first member 62.

Although the fourth member 68 of the bead lock assembly 60 is shown in FIG. 10 as being at the "middle" of the bead lock assembly 60, it will be appreciated that according to other embodiments, the fourth member 68 may be at a different part of the bead lock assembly 60 (e.g., near the inboard end of the bead lock assembly 60, near the outboard side of the bead lock assembly 60, etc.). Also, although only one fourth member 68 is shown in FIG. 10, it will be appreciated that according to other embodiments, the bead lock assembly 60 may include more than one fourth member 68 (e.g., one near the inboard end, another one near the outboard end, etc.). It will also be appreciated that the second member 64 and/or the third member 66 may also extend a distance (e.g., distance "d") above the inboard wheel flange 14 when the bead lock assembly 60 is installed.

Additionally, it will be appreciated that according to various embodiments the first member 62 may be a single first member 62 which extends around the circumference of the wheel 18, or according to other embodiments, may include a plurality of first members 62 connected together around the circumference of the wheel 18 to form a first member 62 subassembly. Similarly, it will be appreciated that the second member 64 may be a single second member 64 which extends around the circumference of the wheel 18, or may include a plurality of second members 64 connected together around the circumference of the wheel 18 to form a second member 64 subassembly. Similarly, it will be appreciated that the third member 66 may be a single third member 66 which extends around the circumference of the wheel 18, or may include a plurality of third members 66 connected together around the circumference of the wheel 18 to form a third member 66 subassembly. Similarly, it will be appreciated that the fourth member 68 may be a single fourth member 68 which extends around the circumference of the wheel 18, or may include a plurality of fourth members 68 connected together around the circumference of the wheel 18 to form a fourth member 68 subassembly. Collectively, the tire 16, the wheel 18 and the bead lock assembly 60 form a system.

Figure 11:
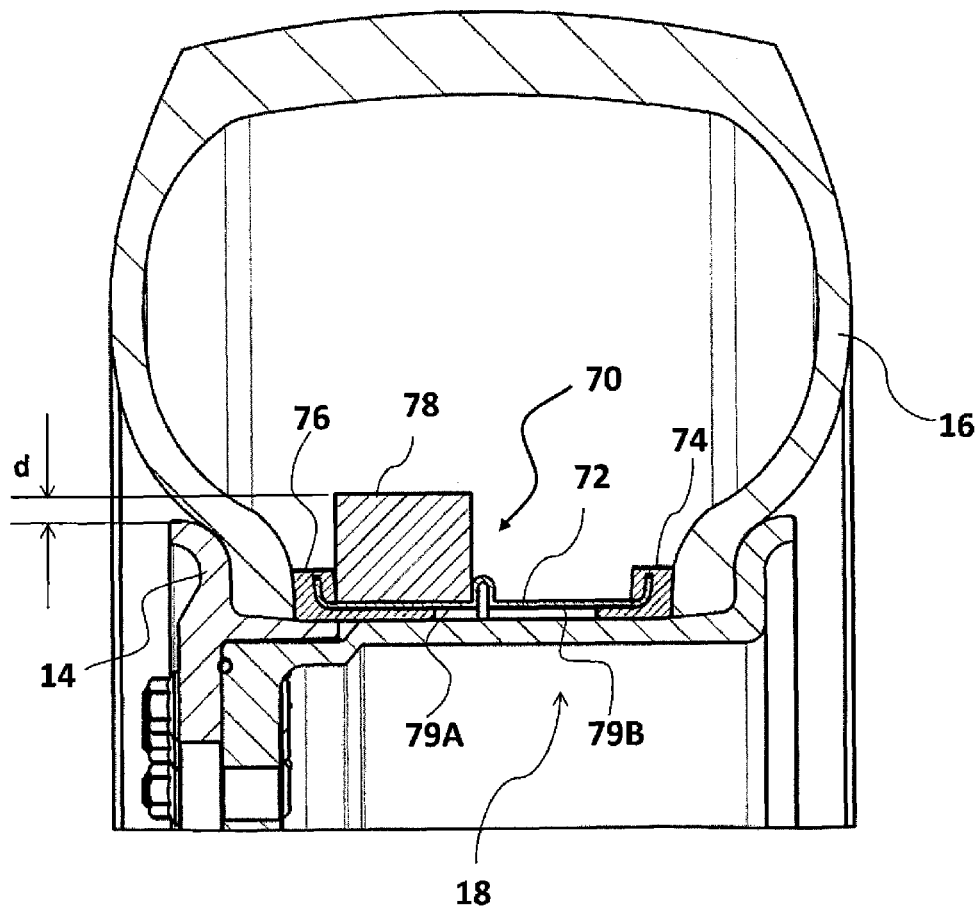
FIG. 11 illustrates a cross-section of yet another bead lock assembly according to various embodiments.

FIG. 11 illustrates a cross-section of a bead lock assembly 70 according to various embodiments; The bead lock assembly 70 is similar to the bead lock assembly 60 of FIG. 10 in that it includes at least four components (first member 72, second member 74, third member 76 and fourth member 78), but is different in a number of ways. First, instead of the first member 72 forming a single groove or channel to accommodate the secure positioning of the fourth member 78 at the "middle" of the first member 72, the first member 72 is formed with a "left of center" groove 79A and a "right of center" groove 79B. Second, the fourth member 78, which extends above the outboard wheel flange 14 a distance "d" when the bead lock assembly 70 is installed, is positioned above the "left of center" groove 79A. According to various embodiments, the fourth member 78 extends at least a pre-determined distance above the outboard wheel flange 14 when the bead lock assembly 70 is installed. For example, the pre-determined distance above the wheel flange 14 may be substantially equal to or greater than the thickness of the sidewall of the tire 16. Third, the third member 76 extends a distance "under" (radially inward from) both the first member 72 and the fourth member 78.

The first, second, third and fourth members 72, 74, 76, 78 may be fabricated from any suitable material. For example, according to various embodiments, the second, third and fourth members 74, 76, 78 are fabricated from a "soft" material (e.g., a rubber, an elastomer, etc.) whereas the first member 72 is fabricated from a "hard" material (e.g., a metal, a plastic, a composite material, etc.). The second member 74 is positioned around an inboard "end" of the first member 72 and against an interior surface of the tire 16. The third member 76 is positioned around an outboard "end" of the first member 72, against an interior surface of the tire 16, and "under" both the first member 72 and the fourth member 78. The fourth member 78 is positioned "over" the first member 72 "left of center" toward the outboard side. According to various embodiments, the second member 74 is clamped and positioned against the inboard side of the interior surface of the tire 16 and the first member 72. The third member 76 is clamped and positioned against the outboard side of the interior surface of the tire 16, the outboard side of the first member 72, and the outboard side of the third member 78. The fourth member 78 is clamped and positioned above the first member 72 "left of center". According to other embodiments, the second member 74, the third member 76 and/or the fourth member 78 may be adhered to the first member 72.

Although the fourth member 78 of the bead lock assembly 70 is shown in FIG. 11 as being "above" the "left of center" groove or channel 79A of the first member 72, it will be appreciated that according to other embodiments, the fourth member 78 may be at a different part of the bead lock assembly 70 (e.g., above the "right of center" groove or channel 79B of the first member 72, etc.). Also, although only one fourth member 78 is shown in FIG. 11, it will be appreciated that according to other embodiments, the bead lock assembly 70 may include more than one fourth member 78 (e.g., another one above the "right of center" groove or channel 79B of the first member 72, etc.). It will also be appreciated that the second member 74 and/or the third member 76 may also extend a distance (e.g., distance "d") above the inboard wheel flange 14 when the bead lock assembly 70 is installed. Also, it will be appreciated that for embodiments where a fourth member 78 is positioned "over" the "right of center" groove or channel 79B of the first member 72, the second member 74 may also extend under both the first member 72 and the fourth member 78.

Additionally, it will be appreciated that according to various embodiments the first member 72 may be a single first member 72 which extends around the circumference of the wheel 18, or according to other embodiments, may include a plurality of first members 72 connected together around the circumference of the wheel 18 to form a first member 72 subassembly. Similarly, it will be appreciated that the second member 74 may be a single second member 74 which extends around the circumference of the wheel 18, or may include a plurality of second members 74 connected together around the circumference of the wheel 18 to form a second member 74 subassembly. Similarly, it will be appreciated that the third member 76 may be a single third member 76 which extends around the circumference of the wheel 18, or may include a plurality of third members 76 connected together around the circumference of the wheel 18 to form a third member 76 subassembly. Similarly, it will be appreciated that the fourth member 78 may be a single fourth member 78 which extends around the circumference of the wheel 18, or may include a plurality of fourth members 78 connected together around the circumference of the wheel 18 to form a fourth member 78 subassembly. Collectively, the tire 16, the wheel 18 and the bead lock assembly 70 form a system.

Figure 12:
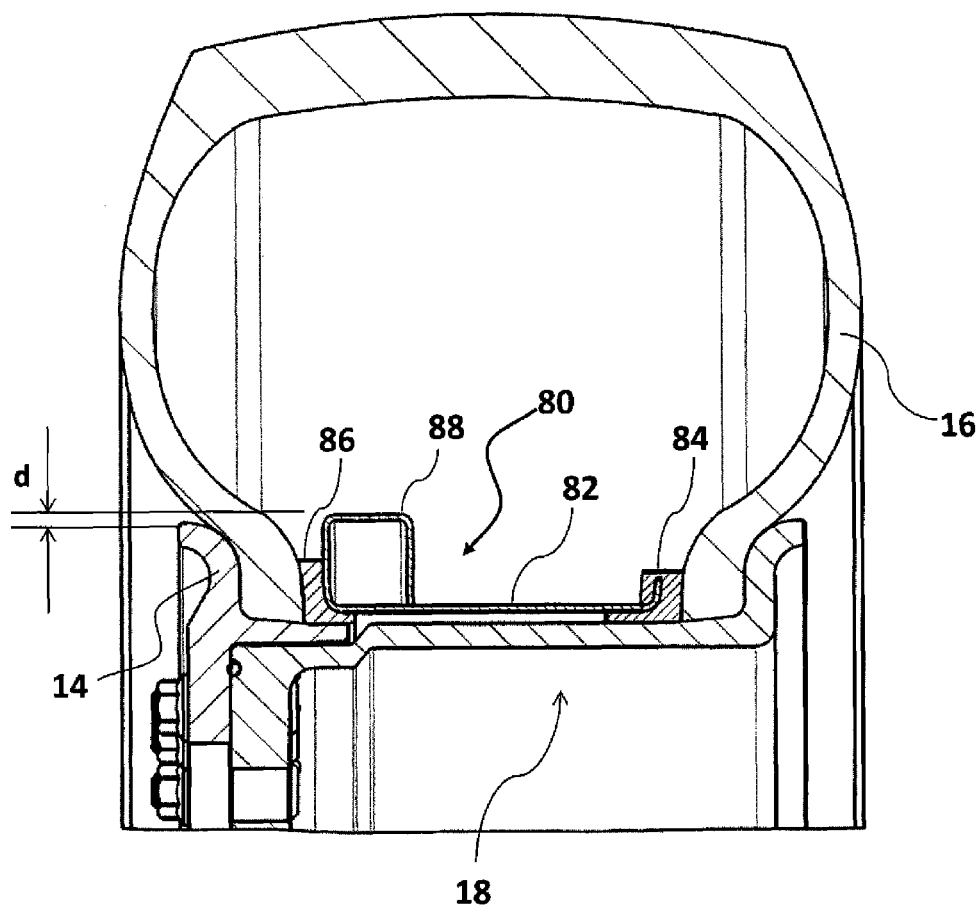
FIG. 12 illustrates a cross-section of yet another bead lock assembly according to various embodiments.

FIG. 12 illustrates a cross-section of a bead lock assembly 80 according to various embodiments. The bead lock assembly 80 includes a first member 82, a second member 84 and a third member 86. The first member 82 may be formed from any suitable material (e.g., a metal, a plastic, a composite material, etc.) and is formed with a raised portion 88 which is "taller" than the rest of the first member 82 and extends above the outboard wheel flange 14 a distance "d" when the bead lock assembly 80 is installed. According to various embodiments, the raised portion 88 extends at least a pre-determined distance above the outboard wheel flange 14 when the bead lock assembly 80 is installed. For example, the pre-determined distance above the wheel flange 14 may be substantially equal to or greater than the thickness of the sidewall of the tire 16.

Although the raised portion 88 of the bead lock assembly 80 is shown in FIG. 12 as being proximate the outboard end (curb-side) of the bead lock assembly 80, it will be appreciated that according to other embodiments, the raised portion 88 may be at a different part of the bead lock assembly 80 (e.g., proximate the inboard end of the bead lock assembly 80, in the "middle" of the bead lock assembly 80, etc.). Also, although only one raised portion 88 is shown in FIG. 12, it will be appreciated that according to other embodiments, the bead lock assembly 80 may include more than one raised portion 88 (e.g., one raised portion 88 proximate the outboard end and one raised portion 88 proximate the inboard end). Additionally, it will be appreciated that according to various embodiments the first member 82 may be a single first member 82 which extends around the circumference of the wheel 18, or according to other embodiments, may include a plurality of first members 82 connected together around the circumference of the wheel 18 to form a first member 82 subassembly.

The second and third members 84, 86 may be fabricated from any suitable material. For example, according to various embodiments, the second and third members 84, 86 are fabricated from a "soft" material (e.g., a rubber, an elastomer, etc.). The second member 84 is positioned around an inboard "end" of the first member 82 and against an interior surface of the tire 16. The third member 86 is positioned against an outboard "end" of the first member 82, against an interior surface of the tire 16, and "under" the first member 82 (between the first member and the axis of rotation). According to various embodiments, the second member 84 is clamped and positioned against the inboard side of the interior surface of the tire 16 and the first member 82. The third member 86 is clamped and positioned against the outboard side of the interior surface of the tire 16 and the first member 82. According to other embodiments, the second member 84 and/or the third member 86 may be adhered to the first member 82.

Additionally, it will be appreciated that according to various embodiments the second member 84 may be a single second member 84 which extends around the circumference of the wheel 18, or according to other embodiments, may include a plurality of second members 84 connected together around the circumference of the wheel 18 to form a second member 84 subassembly. Similarly, it will be appreciated that the third member 86 may be a single third member 86 which extends around the circumference of the wheel 18, or may include a plurality of third members 86 connected together around the circumference of the wheel 18 to form a third member 86 subassembly. Collectively, the tire 16, the wheel 18 and bead lock assembly 80 form a system.

Figure 13:
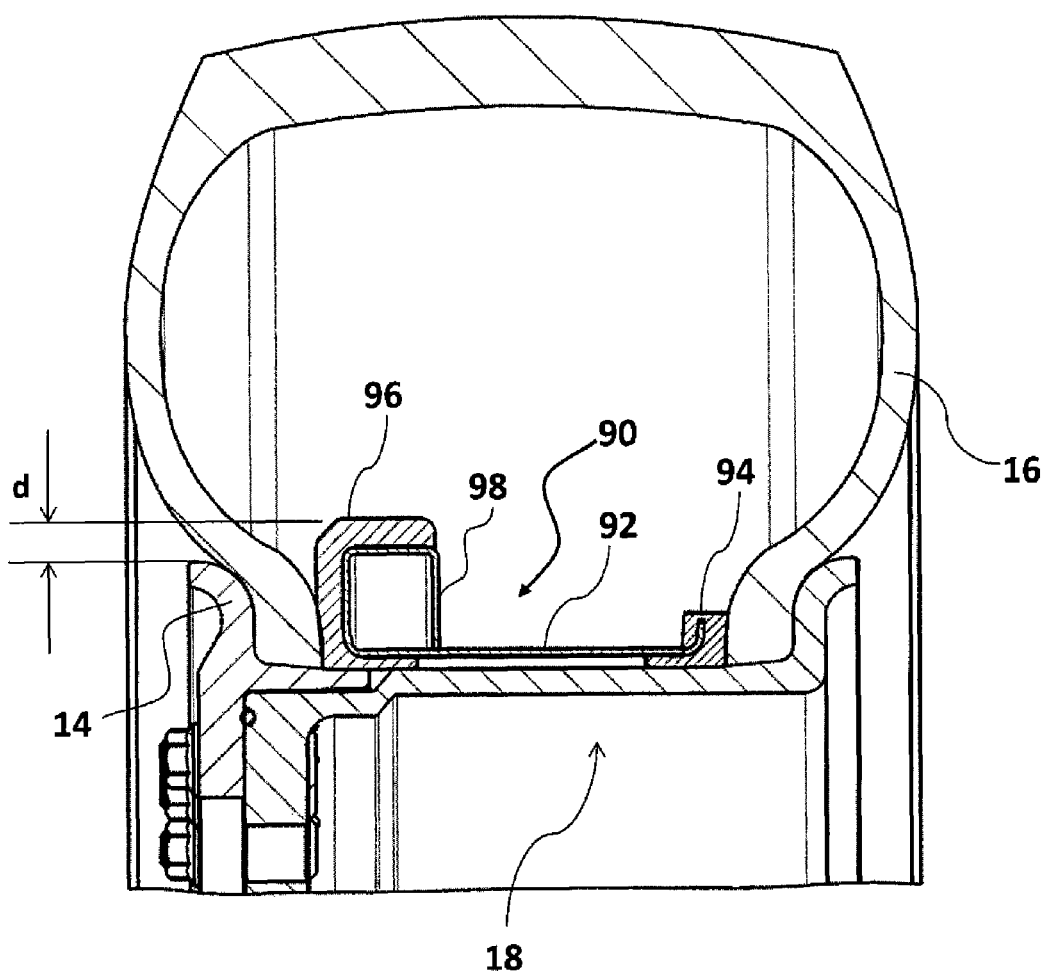
FIG. 13 illustrates a cross-section of yet another bead lock assembly according to various embodiments.

FIG. 13 illustrates a cross-section of a bead lock assembly 90 according to various embodiments. The bead lock assembly 90 is similar to the bead lock assembly 80 of FIG. 12 in that it includes a first member 92, a second member 94 and a third member 96, where the first member 92 includes a raised portion 98, but is different in that the third member 96 is positioned around the outboard end of the raised portion 98 (the third member 96 includes a portion which extends radially outward from the outermost radial surface of the first member 92) and extends above the outboard wheel flange 14 a distance "d" when the bead lock assembly 90 is installed. Also, although the raised portion 98 is "taller" than the rest of the first member 92, the raised portion does not necessarily extend above the wheel flange 14. According to various embodiments, the radially outermost portion of the raised portion 98 may extend "above" the wheel flange 14 as shown in FIG. 13, be at the same "height" as the radially outermost portion of the wheel flange 14, or be a distance below the radially outermost portion of the wheel flange 14. According to various embodiments, the third member 96 extends at least a pre-determined distance above the outboard wheel flange 14 when the bead lock assembly 90 is installed. For example, the pre-determined distance above the wheel flange 14 may be substantially equal to or greater than the thickness of the sidewall of the tire 16.

The first member 92 may be formed from any suitable material (e.g., a metal, a plastic, a composite material, etc.). Although the raised portion 98 of the bead lock assembly 90 is shown in FIG. 13 as being proximate the outboard end (curb-side) of the bead lock assembly 90, it will be appreciated that according to other embodiments, the raised portion 98 may be at a different part of the bead lock assembly 90 (e.g., proximate the inboard end of the bead lock assembly 90, in the "middle" of the bead lock assembly 90, etc.). Also, although only one raised portion 98 is shown in FIG. 13, it will be appreciated that according to other embodiments, the bead lock assembly 90 may include more than one raised portion 98 (e.g., one raised portion 98 proximate the outboard end and one raised portion 98 proximate the inboard end). Additionally, it will be appreciated that according to various embodiments the first member 92 may be a single first member 92 which extends around the circumference of the wheel 18, or according to other embodiments, may include a plurality of first members 92 connected together around the circumference of the wheel 18 to form a first member 92 subassembly.

The second and third members 94, 96 may be formed from any suitable material. For example, the second and third members 94, 96 may be formed from a "soft" material such as, for example, a rubber or an elastomer. The second member 94 is positioned around an inboard "end" of the first member 92 and against an interior surface of the tire 16. The third member 96 is positioned around an outboard "end" of the first member 92 and against an interior surface of the tire 16. According to various embodiments, the second member 94 is clamped and positioned against the inboard side of interior surface of the tire 16 and the first member 92. The third member 96 is clamped and positioned against the outboard side of the interior surface of the tire 16 and the first member 92. According to other embodiments, the second member 94 and/or the third member 96 may be adhered to the first member 92.

Additionally, it will be appreciated that according to various embodiments the second member 94 may be a single second member 94 which extends around the circumference of the wheel 18, or according to other embodiments, may include a plurality of second members 94 connected together around the circumference of the wheel 18 to form a second member 94 subassembly. Similarly, it will be appreciated that the third member 96 may be a single third member 96 which extends around the circumference of the wheel 18, or may include a plurality of third members 96 connected together around the circumference of the wheel 18 to form a third member 96 subassembly. Collectively, the tire 16, the wheel 18 and the bead lock assembly 90 form a system.

Figure 14:
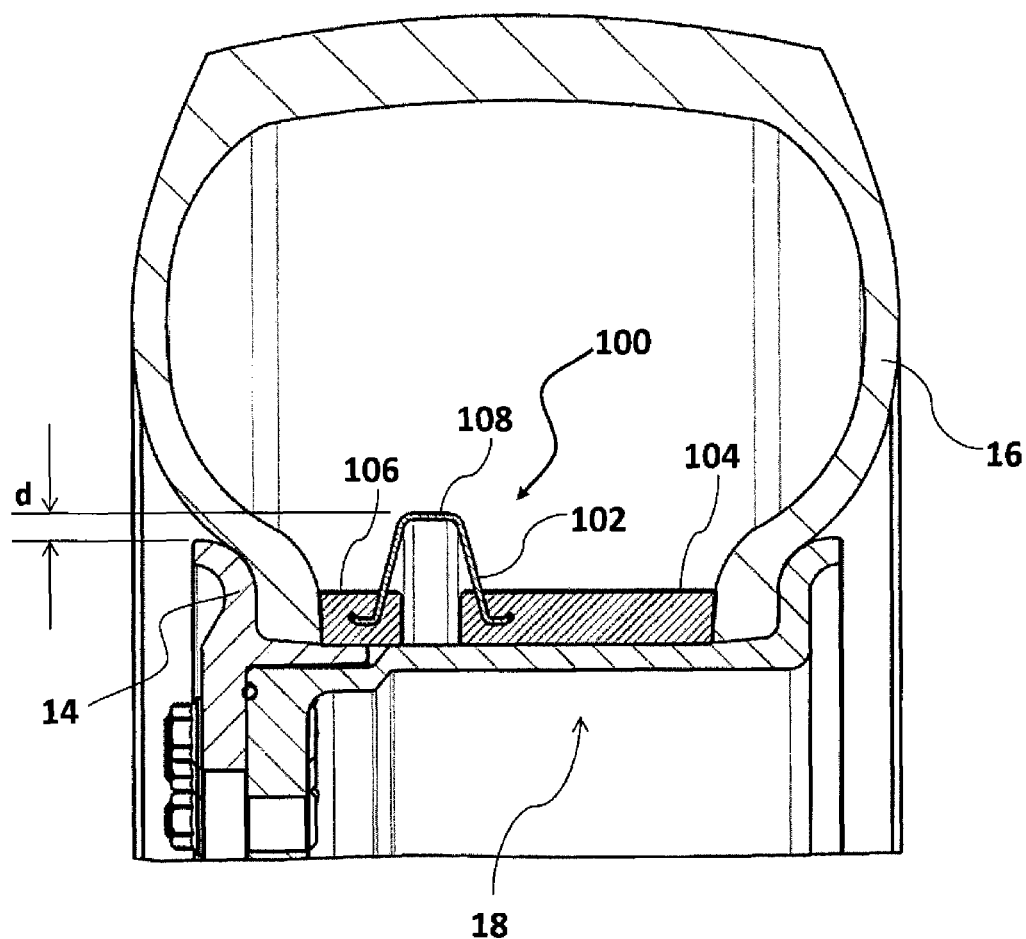
FIG. 14 illustrates a cross-section of yet another bead lock assembly according to various embodiments.

FIG. 14 illustrates a bead lock assembly 100 according to various embodiments. The bead lock assembly 100 includes a first member 102, a second member 104 and a third member 106, where the first member 102 includes a raised portion 108 which extends above the outboard wheel flange 14 a distance "d" when the bead lock assembly 100 is installed. According to various embodiments, the raised portion 108 extends at least a pre-determined distance above the outboard wheel flange 14 when the bead lock assembly 100 is installed. For example, the pre-determined distance above the wheel flange 14 may be substantially equal to or greater than the thickness of the sidewall of the tire 16.

The first member 102 may be formed from any suitable material (e.g., a metal, a plastic, a composite material, etc.). Although the raised portion 108 of the first member 102 is shown in FIG. 14 as being "left of center" of the bead lock assembly 100 (toward the outboard end of the bead lock assembly 90), it will be appreciated that according to other embodiments, the raised portion 108 may be at a different part of the bead lock assembly 100 (e.g., "right of center" toward the inboard end of the bead lock assembly 100, in the "middle" of the bead lock assembly 100, etc.). For embodiments like those shown in FIG. 14, where the raised portion 108 is "left of center", the second member 104 has a "left-to-right width" (an axial length) which is greater than the "left-to-right width" of the third member 106. For embodiments where the raised portion 108 is "right of center", the second member 104 has a "left-to-right width" which is less than the "left-to-right width" of the third member 106. For embodiments where the raised portion 108 is proximate the center of the bead lock assembly 100, the "left-to-right" width of the second and third members 104, 106 may be substantially equal. Also, although only one raised portion 108 is shown in FIG. 14, it will be appreciated that according to other embodiments, the bead lock assembly 100 may include more than one raised portion 108 (e.g., one raised portion 108 "left of center" and one raised portion 108 "right of center"). For such embodiments, the bead lock assembly 100 may further include an additional member similar to the second and third members 104, 106. Additionally, it will be appreciated that according to various embodiments the first member 102 may be a single first member 102 which extends around the circumference of the wheel 18, or according to other embodiments, may include a plurality of first members 102 connected together around the circumference of the wheel 18 to form a first member 102 subassembly.

The second and third members 104, 106 may be formed from any suitable material. For example, the second and third members 104, 106 may be formed from a "soft" material such as, for example, a rubber or an elastomer. The second member 104 is positioned around an inboard "end" of the first member 102 and against an interior surface of the tire 16. The third member 106 is positioned around an outboard "end" of the first member 102 and against an interior surface of the tire 16. According to various embodiments, the second member 104 is clamped and positioned against the inboard side of the interior surface of the tire 16 and the first member 102. The third member 106 is clamped and positioned against the outboard side of the interior surface of the tire 16 and the first member 102. According to other embodiments, the second member 104 and/or the third member 106 may be adhered to the first member 102.

Additionally, it will be appreciated that according to various embodiments the second member 104 may be a single second member 104 which extends around the circumference of the wheel 18, or may include a plurality of second members 104 connected together around the circumference of the wheel 18 to form a second member 104 subassembly. Similarly, it will be appreciated that the third member 106 may be a single third member 106 which extends around the circumference of the wheel 18, or may include a plurality of third members 106 connected together around the circumference of the wheel 18 to form a third member 106 subassembly. Collectively, the tire 16, the wheel 18 and the bead lock assembly 100 form a system.

In view of the above, it will be appreciated that the bead lock and the bead lock assemblies shown in FIGS. 5-14 can provide protection to the wheel flanges when the tire is being operated at a lower than normal tire pressure. It will also be appreciated that the components of the bead lock and/or bead lock assemblies can be made in a variety of "heights/thicknesses", "widths" (axial lengths), etc. for use with a range of different tire and wheel geometries.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the described invention. For example, although the bead lock and bead lock assemblies shown in FIGS. 5-14 are shown as being utilized with a certain wheel configuration, it will be appreciated that other embodiments of the bead lock and the bead lock assemblies may be utilized with other wheel configurations (e.g., with beadlock wheels). Accordingly, it is understood that the drawings and the descriptions herein are proffered only to facilitate comprehension of the invention and should not be construed to limit the scope thereof.

What is claimed is:

1. A system, comprising:
   a wheel, wherein the wheel defines an axis of rotation and comprises an outboard wheel flange and an inboard wheel flange;
   a tire mounted on the wheel, wherein the tire and the wheel cooperate to define a tire cavity; and
   a bead lock within the tire cavity, wherein the bead lock comprises:
      a first portion comprising a radially outermost surface which is a first distance from the axis of rotation;
   wherein at least one of the outboard and inboard wheel flanges comprises a radially outermost surface which is a second distance from the axis of rotation, wherein the first distance is greater than the second distance; and
   wherein a difference between the first distance and the second distance is greater than a thickness of a sidewall of the tire; and
   wherein the bead lock further comprises a second portion comprising a radially outermost surface which is a third distance from the axis of rotation.

2. The system of claim 1, wherein the radially outermost surface of the first portion of the bead lock is at an outboard end of the bead lock.

3. The system of claim 1, wherein the radially outermost surface of the first portion of the bead lock is at an inboard end of the bead lock.

4. The system of claim 1, wherein the radially outermost surface of the first portion of the bead lock is between an outboard end and an inboard end of the bead lock.

5. The system of claim 1, wherein the bead lock is connected to at least one other bead lock.

6. A system, comprising:
   a wheel, wherein the wheel defines an axis of rotation and comprises an outboard wheel flange and an inboard wheel flange;
   a tire mounted on the wheel, wherein the tire and the wheel cooperate to define a tire cavity; and
   a bead lock assembly within the tire cavity, wherein the bead lock assembly comprises:
      a first portion comprising a radially outermost surface which is a first distance from the axis of rotation;
   wherein at least one of the outboard and inboard wheel flanges comprises a radially outermost surface which is a second distance from the axis of rotation, wherein the first distance is greater than the second distance;
   wherein a difference between the first distance and the second distance is greater than a thickness of a sidewall of the tire; and
   wherein the bead lock further comprises a second portion comprising a radially outermost surface which is a third distance from the axis of rotation.

7. The system of claim 6, wherein the radially outermost surface of the first portion of the bead lock assembly is at an outboard end of the bead lock assembly.

8. The system of claim 6, wherein the radially outermost surface of the first portion of the bead lock assembly is at an inboard end of the bead lock assembly.

9. The system of claim 6, wherein the radially outermost surface of the first portion of the bead lock assembly is between an outboard end and an inboard end of the bead lock assembly.

* * * * *